Jan. 25, 1949.　　　V. C. WESTCOTT　　　2,459,858
ELECTRICAL PULSE SYSTEM
Filed Dec. 21, 1944
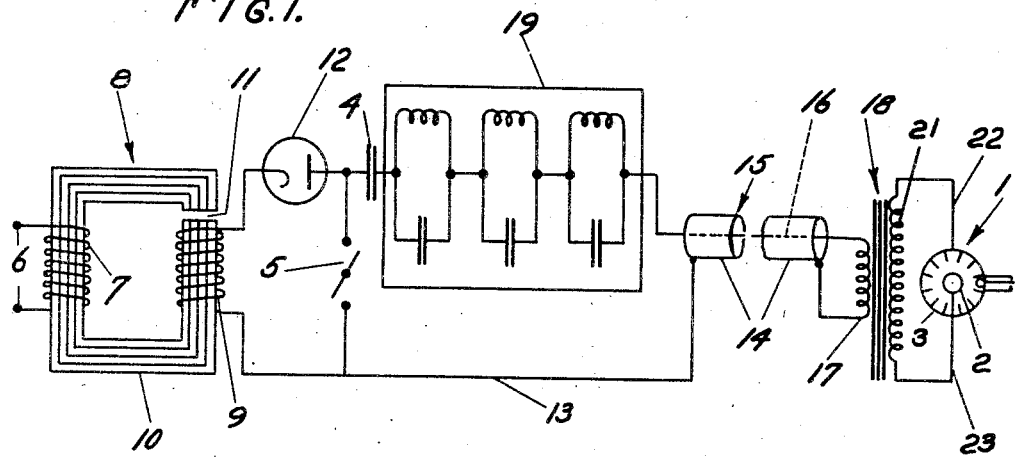

Patented Jan. 25, 1949

2,459,858

UNITED STATES PATENT OFFICE 2,459,858

ELECTRICAL PULSE SYSTEM

Vernon C. Westcott, Lincoln, Mass., assignor to Raytheon Manufacturing Company, Newton, Mass., a corporation of Delaware Application December 21, 1944, Serial No. 569,230

6 Claims. (Cl. 320—1)

This invention relates to electrical systems adapted to produce pulses of current of a predetermined wave form such, for example, as systems for producing substantially rectangular pulses of current for various purposes.

In systems of the type to which the invention relates, an energy storage device, such as a condenser, is charged from a suitable source of current and intermittently discharged through a wave-shaping network into a load circuit. Such systems are applicable, for example, in radar equipment where it is desired to energize an ultra-high frequency generator, such as a magnetron, for intermittent periods. In such case the ultra-high frequency generator may be energized as frequently as 1000 times per second and the duration of each energization may be of the order of a microsecond. The energizing impulse desired for this purpose is substantially rectangular and is derived from the discharge of the condenser through a suitable pulse line. The condenser is charged through a rectifier connected to a source of alternating current and the discharge of the condenser may be controlled by a rotary spark gap driven in synchronism with the alternating current source. It is usual to interpose a transformer between the alternating current source and the rectifier. Where the rectifier is of the half wave type it has heretofore been necessary to provide an alternating current generator having a relatively high volt-ampere rating, as compared with that required where a full wave rectifier is used. Also the transformer between the alternating current generator and the rectifier must have a similarly high volt-ampere rating, as compared to that required when a full wave rectifier is used. On the other hand, the use of a full wave rectifier materially complicates the circuit and increases the size and cost of the system.

It is among the objects of the present invention to provide a system of the type described in which the advantages of the half wave rectifier may be retained without the major disadvantages inherent in such systems.

The above and other objects and features of the invention will be made fully apparent to those skilled in the art from a consideration of the following detailed description taken in conjunction with the accompanying drawing in which:

Fig. 1 diagrammatically illustrates an embodiment of the invention as applied to an ultra-high frequency generator of the magnetron type;

Fig. 2 shows a set of curves illustrating certain operating characteristics of the invention;

Fig. 3 is a curve showing the nature of the current drawn by the primary winding of a power supply transformer in a system of conventional design; and Fig. 4 is a curve similar to Fig. 3 showing the current drawn by the primary of the power supply transformer in a system constructed in accordance with the present invention.

Referring to the drawing, reference numeral 1 indicates a generator of ultra-high frequency oscillations. The generator 1 may be of any suitable type. In the instance shown, it is of the magnetron type having a cathode 2 and an anode 3, which anode is in the form of a cylinder having inwardly projecting radial arms providing a plurality of anode faces coacting with the cathode 2 in a well-known manner. The generator 1 is adapted to be energized by pulses of current supplied from a system including a condenser 4, the discharge of which is controlled by a rotary spark gap device 5. The condenser 4 is adapted to be charged from a source of alternating current connected to the terminals 6. It will be understood that the frequency of the alternating current source is preferably the same as the repetition frequency of the energization impulses supplied to the ultra-high frequency generator 1 and is usually in the neighborhood of 400 cycles per second, but may be as high as 1000 cycles per second or more. The terminals 6 are connected to opposite ends of a primary winding 7 of a transformer 8 having a secondary winding 9. The transformer 8 has a core 10 of laminated iron or steel. For reasons which will hereinafter appear, an air gap 11 is provided in the core 10. For purposes of illustration the length of the gap 11 is exaggerated in the drawing. In practice the length of the gap may be about 0.014 inch. One end of the secondary winding 9 is connected to one side of the condenser 4 through a rectifying tube 12. The other end of the secondary winding 9 is connected by way of a lead 13 to the outer conductor 14 of a coaxial cable 15, a primary winding 17 of a transformer 18, the other conductor 16 of the coaxial cable 15, and a pulse line 19 to the other side of condenser 4. One terminal of the rotary spark gap 5 is connected to the lead 13, and the other terminal thereof is connected to the connection between the condenser 4 and the rectifier 12. The secondary winding 21 of the transformer 18 has one end connected by a lead 22 to the anode 3 of the magnetron 1 and the opposite end of the secondary winding 21 is connected by a lead 23 to the cathode 2 of said magnetron.

In the operation of the system described in the foregoing, alternating current, having a frequency equal to a small multiple of the desired repetition frequency of the system, is applied to the terminals 6. The rotary spark gap device 5 is driven in synchronism with the applied frequency to permit the gap to fire once for each cycle of the alternating current. When the charging current is in one direction, at a time when the spark gap is in open position, the condenser 4 is charged, the current flowing from the lower end of the secondary winding 9 by way of lead 13 and one of the conductors 14 of the concentric line 15 to winding 17 and thence through the other conductor 16 of the concentric line and the pulse 19 to the right side of the condenser. The return connection from the left side of the condenser to the upper end of the winding 9 is controlled by a blocking tube 12. When the gap 5 fires, the condenser 4 is discharged into the load circuit, including the transformer 18, through the pulse line 19 and concentric line 15 to apply the desired energization impulse to the magnetron 1.

It will be seen that if the energy of but one-half of the wave supplied by the alternating current source at 6 is utilized to charge the condenser 4 through a conventional transformer, then the volt-ampere rating of the alternating current generator, as well as that of the transformer 10, will necessarily be high. On the other hand, if it be attempted to provide full wave rectification of the charging current to the condenser 4, then the circuit would be greatly complicated. I have found it possible to retain the simplicity of the half wave rectifier and at the same time reduce the volt-ampere rating of elements of the circuit to values comparable to those of a set having full wave rectification by providing an air gap 11 in the core 10. For example, I have found that in a set operating at 400 cycles per second with 115 volts on the primary winding, the primary current could be reduced from five amperes to three amperes by the use of such an air gap. This effect of the air gap may be best understood by reference to Fig. 2 of the drawing. In this figure the curve $a$ represents the voltage current relations in a transformer having no air gap in the core. This curve was taken with the spark gap open and shows only capacitive currents. The curve $c$ shows the same relation between the voltage and current in a circuit substantially identical with that of curve $a$ except that an air gap of .014 of an inch was provided in the core of the transformer. In each of these cases, the condenser was connected across the secondary through the pulse line. The curve $b$ represents the same relationship as the curve $c$ except that in this case the secondary winding of the transformer is open. It will be observed that the curve $a-b$ obtained by subtracting any value $b$ from the corresponding value of $a$ is almost identical with the curve $c$. This shows that the primary current drawn with the open secondary when an air gap is provided in the core is substantially equal to the reduction in the primary current, under load conditions, resulting from the insertion of the air gap in the core. Thus, the current drawn by the primary winding 7 during that half wave of the applied alternating voltage when the current is in such a direction that the condenser 4 may be charged through the blocking tube 12 is greatly reduced over the value of the current that would be drawn during the same half wave if no air gap were provided in the core 10 of the transformer 8.

However, during the next half wave of the applied alternating voltage, that is when the secondary circuit is open due to the blocking action of the tube 12, the energy drawn upon this half wave is added to that drawn during the other half wave, and the total value $(b+c)$ will be substantially equal to $a$. Thus, although only half wave rectification is provided, it will be seen that the arrangement of the present invention draws energy during each half wave of the alternating current cycle and that the sum of the values of the energy drawn during the two half waves of the alternating voltage is substantially equal to the energy that would be drawn during a single half wave of the applied voltage if no air gap is provided in the care 10 of the transformer 8.

Further advantages of the system of the present invention reside in the fact that the wave form of the primary current is also improved, as shown by the curves in Figs. 3 and 4. These curves show the charging current relations versus time in the primary winding. Fig. 3 represents the relation in the case where no gap is provided in the transformer core, and Fig. 4 shows the same relation where a gap of .014 of an inch is provided. It will be understood that the curves represent oscillograms taken under identical conditions, except for the presence or absence of the gap 11. The frequency of the applied voltage was in each case 420 cycles per second. It will be seen that the amplitude of current drawn in the case shown in Fig. 4 is substantially reduced from that shown in Fig. 3. Furthermore, it will be noted that in Fig. 3 the current wavers about the zero line for a substantial portion of the cycle, whereas in Fig. 4 the current touches the zero line only instantaneously.

From the foregoing, it will be seen that the invention provides a construction in which certain advantages of full wave rectification are obtained, in a system of the type described, while the advantages and simplicity of a system having half wave rectification are retained. The advantages are particularly apparent, for example, in radar sets where the reduction in the size and weight of the alternator become a material factor. Also a substantial reduction in the size of the primary winding 7 of the transformer 8 is possible.

While there has been herein described a preferred embodiment of the invention, other modifications and variations within the scope of the appended claims will be apparent to those skilled in the art. For example, while the invention has been shown and described as applied to the energization of an ultra-high frquency generator, it will be apparent that the invention may be applied to other load circuits. It will likewise be apparent that various equivalent devices may be substituted for some of the elements of the circuit shown. For example, other and suitable rectifiers may be used instead of the blocking tube 12 and also other circuit control means may be used instead of the rotary spark gap device 5. Also instead of providing a storage condenser 4 separate from the pulse line 19, the storage capacity may consist of the capacitance of the pulse line itself where this is suitably arranged.

What is claimed is:

1. A condenser charging and discharging system comprising a condenser, a source of alternating current for charging said condenser, a transformer between said source and said condenser, said transformer including a magnetic core, said core having an air gap of approximately .014 inch, a half wave rectifier between said transformer and said condenser, a load circuit, and means for intermittently connecting said condenser to said load circuit to discharge said condenser into said load circuit.

2. A condenser charging and discharging system comprising a condenser, a source of alternating current for charging said condenser, a transformer between said source and said condenser, said transformer including a magnetic core, said core having an air gap, a half wave rectifier between said transformer and said condenser, a load circuit, and means for intermittently connecting said condenser to said load circuit to discharge said condenser into said load circuit.

3. A condenser charging and discharging system comprising a condenser, a source of alternating current for charging said condenser, a transformer between said source and said condenser, said transformer including a magnetic core, said core having an air gap, a half wave rectifier between said transformer and said condenser, a load circuit, and means for intermittently connecting and discharging said condenser into said load circuit, the frequency of said source being a small whole number multiple of the frequency at which said intermittent connection is made.

4. A condenser charging and discharging system comprising a condenser, a source of alternating current for charging said condenser, a transformer between said source and said condenser, said transformer including a magnetic core, said core having an air gap of approximately .014 inch, a half wave rectifier between said transformer and said condenser, a load circuit, and means for intermittently connecting and discharging said condenser into said load circuit, the frequency of said source being a small whole number multiple of the frequency at which said intermittent connection is made.

5. In combination, a load circuit, circuit means for connecting said load circuit to a source of alternating potential, a wave-shaping network in said circuit means, a condenser connected to be charged through said wave-shaping network, a transformer between said source and said condenser, said transformer including a magnetic core, said core having an air gap, a half wave rectifier between said transformer and said condenser, and means for intermittently discharging said condenser through said wave-shaping network, the frequency of said source being a small whole number multiple of the frequency at which said condenser is discharged through said wave-shaping network.

6. In combination, a load circuit, circuit means for connecting said load circuit to a source of alternating potential, a wave-shaping network in said circuit means, a condenser connected to be charged through said wave-shaping network, a transformer between said source and said condenser, said transformer including a magnetic core, said core having an air gap of approximately .014 of an inch, a half wave rectifier between said transformer and said condenser, and means synchronized with said source of alternating potential for intermittently discharging said condenser through said wave-shaping network, the frequenc of said source being a small whole number multiple of the frequency at which said condenser is discharged through said wave-shaping network.

VERNON C. WESTCOTT.

REFERENCES CITED

The following references are of record in the file of this patent:

UNITED STATES PATENTS

| Number | Name | Date |
| --- | --- | --- |
| 2,085,100 | Knowles et al. | June 29, 2937 |
| 2,235,385 | Rava | Mar. 18, 1941 |
| 2,250,102 | Klemperer | July 22, 1941 |
| 2,359,178 | White | Sept. 26, 1944 |
| 2,378,897 | Burgwin | June 26, 1945 |

FOREIGN PATENTS

| Number | Country | Date |
| --- | --- | --- |
| 548,618 | British | Oct. 16, 1942 |